No. 691,446. Patented Jan. 21, 1902.
H. W. COLBY.
HOSE THIMBLE EXPANDER.
(Application filed Nov. 3, 1900.)
(No Model.)
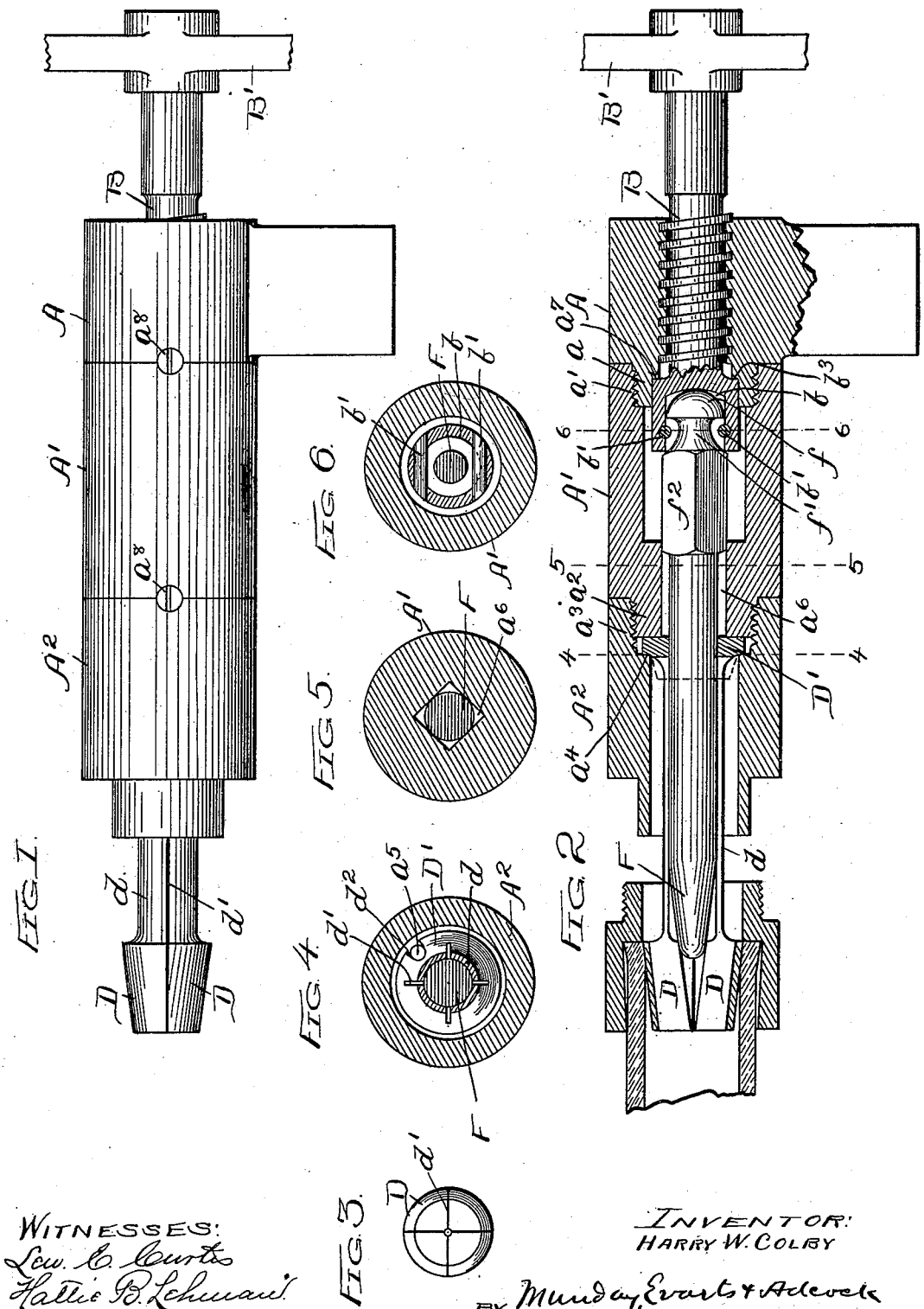
WITNESSES:
Lew. C. Curtis
Hattie B. Lehman
INVENTOR:
HARRY W. COLBY
BY Munday, Evarts & Adcock
HIS ATTORNEYS.

ated together
UNITED STATES PATENT OFFICE.

HARRY W. COLBY, OF CHICAGO, ILLINOIS, ASSIGNOR TO THE AUTOMATIC RACKING MACHINE COMPANY, OF CHICAGO, ILLINOIS, A CORPORATION OF ILLINOIS.

HOSE-THIMBLE EXPANDER.

SPECIFICATION forming part of Letters Patent No. 691,446, dated January 21, 1902.

Application filed November 3, 1900. Serial No. 35,349. (No model.)

*To all whom it may concern:*

Be it known that I, HARRY W. COLBY, a citizen of the United States, residing in Chicago, in the county of Cook and State of Illinois, have invented a new and useful Improvement in Hose-Thimble Expanders, of which the following is a specification.

My invention relates to improvements in devices for expanding metal thimbles in hose to secure couplings or other rings or sleeves thereto.

Hose-thimble expanders heretofore in use have generally consisted of a screw-threaded holder furnished with sockets at its end to receive a series of loose separate detachable expander-jaws, (according to the size of hose and thimble to be operated upon,) which are expanded or forced out radially by a rotary conical wedge having a screw-threaded stem working in the screw-threaded holder, and heretofore considerable difficulty and annoyance has been experienced in their practical operation, owing to the friction between the rotary conical wedge exerting a twisting action on the jaws and breaking the same or the socket portion of the holder in which they fit and also from the loose separate jaws falling out of their sockets or becoming lost.

The object of my improvement is to overcome these difficulties or objections and to provide a hose-thimble expander of a simple, strong, efficient, and durable construction, by means of which hose-thimbles may be conveniently and properly expanded and in which the expander-jaws may be readily changed, according to the diameter of hose and thimble to be operated upon.

My invention consists in the novel construction and combinations of parts and devices herein shown and described, and specified in the claims.

In the drawings, Figure 1 is an elevation of a hose-thimble expander embodying my invention. Fig. 2 is a central longitudinal section. Fig. 3 is an end view of the expander-jaws; and Figs. 4, 5, and 6 are cross-sections on lines 4 4, 5 5, and 6 6, respectively, of Fig. 2.

In the drawings, A represents a screw-threaded holder, in which the operating-screw B turns. The holder A has removable extensions or sleeves A' and A², secured together by screw-threaded portions $a\ a'$ and $a^2\ a^3$.

D D are expander-jaws, the same having integral spring-shanks $d$ and integral head D'. The expander-jaws D are preferably four in number, and the same and their spring-shanks are formed from a single piece of steel by slitting the same, the slits $d'$ extending to or near to the head D'. The flange or head D' fits between the shoulder $a^4$ on the sleeve A² and the end of the sleeve A' and is thus held rigidly in position between the two sleeves. It is prevented from rotation by a pin $a^5$, fitting in a notch $d^2$ in the head D'.

F is a non-rotary conical wedge or expander, which is forced between the expander-jaws D to spread or expand the same by the operating-screw B. The screw B has a socket $b$ in its end to receive the round or semispherical head $f$ of the cone or wedge F, which is connected thereto by removable pins $b'\ b'$, inserted through the socket or bell $b$ on each side of the neck $f'$ of the expander F.

The expander F is prevented from rotation by a flattened or squared portion $f^2$, which fits in a corresponding guide or passage $a^6$ in the sleeve A' of the holder. The screw B has a shoulder $b^3$, which fits against a corresponding shoulder $a^7$ on the holder A and limits the outward movement of the screw when the wedge or expander F is withdrawn from between the jaws D D. The screw-threaded joint $a\ a'$ between the holder A and its extension A' enables the parts to be put together and taken apart when required. The screw-threaded joint $a^2\ a^3$ between the sleeves A' A² enables the integral spring-shank expander-jaws D to be readily removed and replaced with others of different sizes, so that the same tool may be used for expanding hose-thimbles of different sizes. As the wedge, cone, or expander F has no rotary movement in respect to the jaws D D it exerts no twisting or wrenching action thereon, and as the jaws and their spring-shanks $d$ are all in one piece with the head D' the same may be made strong and durable, and there is no danger of the jaws becoming separated or lost. The operating-screw B has a handle B' for turning the same. The extensions or sleeves A' A² of the holder A are locked from turning by lock-screws $a^8$ $a^8$.

I claim—

1. The hose-thimble expander comprising in combination a screw-threaded holder, an operating-screw turning therein, expander-jaws having integral spring-shanks and head, a non-rotatable expander or wedge coupled to said operating-screw, and extensions or sleeves on the holder between which the head of said expander-jaws is clamped, substantially as specified.

2. The combination with a screw-threaded holder and rotating screw, of expander-jaws having integral spring-shanks and head, means for holding said jaws against longitudinal movement, and a non-rotatable expander or wedge operated by said rotating screw, substantially as specified.

3. The combination with a screw-threaded holder, of an operating-screw, expander-jaws, means for holding the jaws against longitudinal movement, and a non-rotating expander or wedge, substantially as specified.

4. The combination with holder-sleeves $A'$ $A^2$ screw-threaded together, of expander-jaws having integral spring-shanks $d$ and head $D'$, clamped between said sleeves $A'$ $A^2$, substantially as specified.

5. The combination with holder-sleeves $A'$ $A^2$ screw-threaded together, of expander-jaws having integral spring-shanks $d$ and head $D'$, clamped between said sleeves $A'$ $A^2$, and a non-rotatable wedge or expander F, substantially as specified.

HARRY W. COLBY.

Witnesses:
EDMUND ADCOCK,
LEWIS E. CURTIS.